United States Patent
Conus (10) Patent No.: US 9,572,006 B2
(45) Date of Patent: Feb. 14, 2017

(54) PARACHUTE ASSEMBLY FOR DEPLOYING A WIRELESS MESH NETWORK

(71) Applicant: NAGRAVISION S.A., Cheseaux-sur-Lausanne (CH)

(72) Inventor: Joel Conus, Essertines-sur-Yverdon (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 139 days.

(21) Appl. No.: 14/308,194

(22) Filed: Jun. 18, 2014

(65) Prior Publication Data

US 2014/0369260 A1 Dec. 18, 2014

(30) Foreign Application Priority Data

Jun. 18, 2013 (EP) ..................................... 13172559

(51) Int. Cl.
| | | |
|---|---|---|
| *H04W 8/00* | (2009.01) | |
| *B64D 17/00* | (2006.01) | |
| *H04W 84/18* | (2009.01) | |
| *H04W 16/18* | (2009.01) | |

(52) U.S. Cl.
CPC ............. *H04W 8/005* (2013.01); *H04W 84/18* (2013.01); *H04W 16/18* (2013.01)

(58) Field of Classification Search
CPC ....... H04W 8/005; H04W 84/18; H04W 16/18
See application file for complete search history.

(56) References Cited

U.S. PATENT DOCUMENTS

| | | | |
|---|---|---|---|
| 2,763,002 A | 9/1956 | Fitzgerald et al. | |
| 2,998,601 A | 8/1961 | Namsick et al. | |
| 4,298,963 A | 11/1981 | Dejob et al. | |
| 6,416,019 B1 | 7/2002 | Hilliard et al. | |
| 9,174,738 B1* | 11/2015 | Roach | B64B 1/40 |
| 2002/0072361 A1* | 6/2002 | Knoblach | H04B 7/18576 |
| | | | 455/431 |
| 2005/0014499 A1* | 1/2005 | Knoblach | B64B 1/40 |
| | | | 455/431 |
| 2005/0040290 A1* | 2/2005 | Suhami | B64D 17/66 |
| | | | 244/146 |
| 2005/0057411 A1 | 3/2005 | Apostolos | |
| 2005/0168393 A1 | 8/2005 | Apostolos | |
| 2008/0159316 A1 | 7/2008 | Dutta et al. | |

(Continued)

FOREIGN PATENT DOCUMENTS

| | | |
|---|---|---|
| DE | 101 39 440 | 4/2003 |
| EP | 2 527 251 | 11/2012 |
| WO | WO 2007/137057 | 11/2007 |

OTHER PUBLICATIONS

European Search Report issued in European Application No. 13172559.0 dated Nov. 20, 2013.

(Continued)

*Primary Examiner* — Brian D Nguyen
(74) *Attorney, Agent, or Firm* — DLA Piper LLP (US)

(57) ABSTRACT

The present invention relates to the deployment of a plurality of wireless communication devices in order to provide a wireless mesh communications network. According to various embodiments, deployment of the communications devices is made by parachutes suitably adapted for the purpose.

15 Claims, 3 Drawing Sheets

(56) References Cited

U.S. PATENT DOCUMENTS

| | | | |
|---|---|---|---|
| 2011/0130636 A1* | 6/2011 | Daniel | G08B 25/016 |
| | | | 600/301 |
| 2011/0285597 A1* | 11/2011 | Yamaguchi | H01Q 1/2291 |
| | | | 343/791 |
| 2012/0303261 A1 | 11/2012 | Bernhardt | |
| 2013/0009013 A1 | 1/2013 | Bourakov et al. | |
| 2013/0009014 A1 | 1/2013 | Bordetsky et al. | |
| 2013/0013131 A1 | 1/2013 | Yakimenko et al. | |
| 2013/0013132 A1 | 1/2013 | Yakimenko et al. | |
| 2013/0013135 A1 | 1/2013 | Yakimenko et al. | |
| 2014/0014770 A1* | 1/2014 | Teller | B64B 1/40 |
| | | | 244/97 |
| 2014/0355476 A1* | 12/2014 | Anderson | H04W 24/02 |
| | | | 370/254 |

OTHER PUBLICATIONS

English language abstract of DE 101 39 440, published Apr. 30, 2003.

\* cited by examiner

PARACHUTE ASSEMBLY FOR DEPLOYING A WIRELESS MESH NETWORK

CROSS REFERENCE TO RELATED APPLICATIONS

This application claims under U.S.C. Section 119 to European Patent Application No. 13172559, filed Jun. 18, 2013, the entire contents of which are hereby incorporated by reference herein.

TECHNICAL FIELD

The present invention relates to the domain of ad-hoc communication networks, otherwise known as mesh networks and more particularly to developments in apparatus used to realize such networks and to methods used for deploying such apparatus in the field.

BACKGROUND ART

Ad-hoc communications networks, otherwise known as mesh networks are known in the state of the art. A wireless mesh network is a communications network comprising a number of wireless receivers, known as nodes, organised in a mesh topology, wherein each of the receivers is also capable of wirelessly transmitting a received signal to one or more of the other nodes in the network. On the other hand, a standard cellular network requires a backbone network connecting cell base stations, wherein the communication must take place over the backbone. A mesh network has the advantage in that it is fully self-configurable and self-healing. After distributing the nodes over a widespread area the nodes themselves discover their nearest neighbours, and discover routes to other nodes in the network independently. Thus, a signal destined to be sent from a point A to a point B may be routed via intermediate nodes in the thus-established mesh network from point A until it reaches point B. If one of the nodes in the network fails, then the network can automatically reconfigure, or "heal", itself to compensate by finding an alternative route from A to B via another combination of intermediate nodes between A and B. This redundancy is made possible by the fact that nodes not affected by an outage are capable of finding each other and setting up new links between themselves, thereby ensuring that a message can still be correctly transmitted in spite of the outage caused by the failure of one or more nodes within the network.

Mesh-networks are perfect for networking large, sparsely inhabited regions or regions which have no existing communications network or where the existing communications network is otherwise damaged or where there is a need to establish a new network as an alternative to an existing network. Such mesh networks tend to rely on batteries, thereby limiting their usefulness over time.

The process of deploying wireless mesh networks is also of concern within the scope of the present invention. Parachutes are known in the state of the art for deploying payloads to remote areas. They are generally circular or conical in design and, once deployed, descend almost vertically through the air where prevailing winds or local air currents may further influence their descent, thus leading to uncertainty as to their eventual particular landing positions. This presents a disadvantage when the payload is to be recovered for example, requiring that the payload land in a spot which is accessible to personnel on the ground. A further disadvantage is that a parachute may have a rate of descent anywhere in the order of around 5 to 10 meters per second (18 km/h to 36 km/h approx.) or possibly even more, depending on the weight of the parachute's payload and the shape and dimensions of the parachute. (Equations allowing for the calculation of speed of descent of a parachute through air depending on the weight of the payload and the form and dimension of the parachute are readily available in the state of the art). This (speed at landing) may lead to damage of the payload when it lands on solid or otherwise rough ground and especially when the payload is fragile. Such problems may be alleviated by releasing the parachute with its payload above a body of water but presents the disadvantage in that the payload then requires to be protected from the water, thus leading to further complexities such as the need for flotation devices and the need to have payloads of a type which cannot be damaged by water.

U.S. Pat. No. 6,416,019 B1 offers a solution to some of the problems mentioned above, by providing a ram-air inflated parachute, otherwise known as a parafoil or parasail, which has the advantage that it is steerable. This allows for the payload to be deployed accurately at a predetermined target and provides a further advantage in that by appropriately guiding the parasail, its speed of descent may be slowed down or otherwise regulated, especially during landing, when the parasail may be guided so as to face the wind thereby providing a soft (slow) landing. A disadvantage of the state of the art parafoil however, is that it requires a human pilot to steer it. According to the mentioned Publication, a parasail system is provided for deploying a payload, the system comprising a parasail having a rectangular shape, and further comprising a guidance control electronics and servo system to control the glide trajectory of the parasail system with respect to a predetermined trajectory.

United States Patent Application Publication number 2013/0,009,014 A1 also discloses a parafoil and payload assembly to guide a deployed payload towards a predetermined target position according to a predetermined glide path. According to a particular embodiment of the invention disclosed therein, the payload comprises a control unit having wireless interface communications circuitry. Such communications circuitry may be useful for example for uploading ground wind magnitude following deployment and during the decent of the parafoil with its payload, or uploading a continuously moving target position during decent. The control unit may be configured to transmit any of all of its measurement information to a control center via the communications circuitry. Furthermore, one control unit may be able to communicate wind speed information for example during its decent to another control unit above it. In this way, a group of descending control units may establish a temporary wireless network during their decent. This may be interpreted as being an ad-hoc or mesh network, especially when the control units further comprise wireless network routing and/or switching software/hardware to route packets, thereby allowing a packet sent from an access point to reach a remote location by way of relaying via nodal hops from control unit to control unit until the packet reaches the remote location (or vice versa from the remote location to the access point). According to another particular embodiment described in the mentioned application, such an ad-hoc network may continue to function long after the control units have landed. Nearest neighbour awareness technology comprised within the control units allow for the control units to configure the mesh network automatically.

BRIEF DESCRIPTION

The prior art teaches the use of free-fall retarding devices for deploying payloads but teaches away from the use of parachutes as free-fall retarding devices due to the non-predictability of their position during descent and upon landing and further due to the risk of damage to the payload during landing. It is suggested in the prior art that parasails or parafoils should rather be used as free-fall retarding devices and fitted with automated guidance devices to control their glide path. It is further taught that during deployment or once deployed, a plurality of parafoil systems comprising appropriate communications circuitry can be used to establish an ad-hoc network.

Some of the embodiments discussed herein may overcome at least some of the problems remaining in the prior art when it is required to quickly and cheaply establish a wireless ad-hoc or mesh network covering a desired area. A plurality of low-cost, lightweight, robust, non-guided systems is proposed. The system may be described as being a parachute assembly. The parachute assembly comprises a parachute and a payload. The parachute comprises a parachute frame, a parachute covering or membrane and at least one antenna. The payload comprises electronic equipment for setting up the communications network and is preferably of light weight. By having non-guided parachutes, the weight and the cost of the assemblies may be kept to a minimum since the payload need not comprise guidance devices. This also allows for the parachutes and payloads to be of simple, robust design. The parachute assemblies may therefore be deployed in large enough quantities to establish an adequate mesh network over the desired area. There is no need to perform accurate guidance of each individual parachute assembly. It is sufficient to distribute the parachutes with their payloads over a general area in sufficient quantities to provide the required communications coverage. This contributes to the cost effectiveness of the solution and to the light weight of the parachute assemblies.

Cheap, low-power and lightweight wireless communications devices are known in the state of the art. For example, one such device is a module known as WiSmart EC32Wxx, a low-power embedded WiFi platform which may fit into an existing or new electronic device. The module is based on a STM32F1x microcontroller and it includes an embedded PCB antenna with a range of up to 400 m with the option of adding an external antenna. It operates using a 3.3V power supply and may have a current consumption as low as 1.1 uA and includes both a receiver and a transmitter and further includes TCP/IP, Telnet and a Web Server. Such a device may be comprised within a payload as part of an embodiment of the present invention.

According to an embodiment, the wireless mesh network may be encrypted.

According to one embodiment, a system is provided, the system comprising:
  a free-fall retarding device; and
  a payload;
the free-fall retarding device comprising:
  a frame; and
  a covering attached to the frame;
the payload being electrically connected to a first antenna, the payload comprising:
  a wireless communications circuit configured at least to:
    detect at least one neighbouring wireless communications circuit; and
    establish a reception and transmission channel with the neighbouring wireless communications circuit via at least the first antenna;
characterised in that:
  the free-fall retarding device is a parachute; and
  the payload is attached to the frame, the frame being made from a metallic material and constituting at least part of the first antenna.

According to another embodiment, provision is made for a free-fall retarding device for deploying a wireless communications circuit, the free-fall retarding device comprising a frame and a covering, wherein:
  the free-fall retarding device is a parachute; and
  the frame is made from a metallic material and is configured to be connected to the wireless communications circuit, the frame serving as an antenna for the wireless communications circuit.

According to still another embodiment, a wireless mesh communications network is provided, the wireless mesh communications network comprising a plurality of systems as described above, wherein the wireless communications circuit of each system is configured to detect a presence of at least one neighbouring wireless communications circuit and to establish at least one reception path for receiving at least part of a signal and to established at least one transmission path for transmitting the received signal towards another neighbouring wireless communications circuit.

According to yet a further embodiment, a method for establishing a wireless mesh communications network over a predetermined area is provided, the method comprising:
  dropping a plurality of systems as described above over the predetermined area;
  dropping a further system as described above over the predetermined area, the further system further comprising an uplink thereby providing an exit point from the network; and
  dropping a still further system as described above over the predetermined area, the still further system further comprising a downlink thereby providing an entry point to the network;
  allowing the plurality of systems to detect neighbouring systems and to build communication channels between themselves, thereby forming the wireless mesh network with an entry point and an exit point.

According to yet even a further embodiment, provision is made for use of a plurality of systems as described above to establish a wireless mesh communications network as described above.

Embodiments described herein may be used to cheaply, quickly and easily provide wireless communication in an area having no connectivity to an already established communications network and/or having very few inhabitants, thereby allowing for users in those areas to communicate electronically with each other or to connect to an already established Wide Area Network (WAN) such as the Internet. Similarly in areas where war has broken out or some disaster has occurred depriving that area of communications and power supply, embodiments of the present invention allow for a robust communications network to be established quickly, conveniently and cheaply without the need for the usual rather heavy infrastructure that would normally be required. A mesh network proposed by embodiments of the present invention, which could be deployed quickly and cheaply would solve many issues related to the provision of communications connectivity to a remote site.

The system used for the deployment of the mesh network does not need to be guided and therefore may use free-fall retarding devices which are very simple, cheap and light in design. As such, a simple parachute may be used as a free-fall retarding device to deploy small, light electronic circuitry, the parachute therefore having loose design constraints thereby allowing for a light metal structure to be used as a frame and for the frame to be used as an antenna for the electronic circuitry.

BRIEF DESCRIPTION OF THE DRAWINGS

The detailed description which follows will be better understood with reference to the accompanying drawings, which are given as non-limiting examples of embodiments of the invention, wherein.

DETAILED DESCRIPTION OF THE INVENTION

According to one embodiment, a plurality of small, low-cost and low-power electronic communications devices are used to establish a wireless mesh communications network. Examples of wireless communications presently in use are those operating according to the known standard 802.11, otherwise known as WiFi. For the purpose of the present invention, any wireless, RF (Radio Frequency) protocol can be used as long as it provides support for a mesh network to be established i.e. a plurality of nodes within the network should be operable as a receiver and as a transmitter of packets and should be capable of discovering neighbouring nodes and establishing an optimal route for outgoing packets via one or more neighbouring nodes.

Depending on the application, the network could be secured by an additional layer of encryption (for example hardware encryption for military application). Also depending on the application, transit from node to node within the network could be encrypted while the nodes providing entry to and exit from the network could be fully open (for example to give dissidents a connection out of a country which has been cut off form the world by its government). Depending on the network, a node within the network could be configured to only receive messages or signals (for example when used in SIGINT (signal intelligence) or COMINT (communications intelligence). In order to ensure that the mesh network has an exit point, at least one of the nodes within the network may comprise an uplink (e.g. a satellite phone). The basic mesh network therefore provides for node to node communication or hopping. By including a node having an uplink, provision is made for getting signals (commands or data for example) out of the mesh network towards a control center for example. By providing a downlink capability, either on the same node which has the uplink capability or by providing a different node with a downlink, provision is made to get signals (commands or data for example) into the network from, say, a control center.

According to an embodiment, a plurality of parachutes is used to deploy the devices which will form the nodes of the mesh network, one node per parachute. The node comprises electronic circuitry including a low-cost, low-power and lightweight wireless communication chip. The electronic circuitry (690) is comprised within a payload, which is attached to the parachute to form part of a parachute assembly (100, 200, 300, 400). The payload (150) may further comprise a battery for powering the electronic circuitry (690) housed therein. The parachute assemblies (100, 200, 300, 400) are taken to a desired altitude and dropped near a site where a communications network is required to be established, each parachute assembly (100, 200, 300, 400) comprising its parachute (120) and its payload (150). The parachute assemblies (100, 200, 300, 400) may be dropped from a plane or a drone for example. The whole assembly (100, 200, 300, 400) is light, cheap and robust and may be dropped in sufficient quantities to provide the desired communications coverage. Once deployed, electronic circuitry within the payloads automatically establishes a wireless mesh communications network, the circuitry in each payload being adapted to discover its nearest neighbour, and discover routes to other nodes in the network independently. A node in the present context may be defined as all active and passive circuitry necessary to establish part of the mesh network. Due to a particular characteristic of the parachute frame of embodiments of the present invention, which will be described later, it follows that it is correct to describe the node as comprising the electronic circuitry within the payload (including the battery) and at least the parachute frame of the parachute assembly which is used to deploy the payload. It is therefore convenient to describe the complete parachute assembly as a node in the context of the present invention.

Since one of the goals of some embodiments is to provide a parachute assembly as part of a plurality of similar parachute assemblies for establishing a wireless mesh communications network, it is desirable that such parachute assemblies be: lightweight so as to allow it to have a glide speed which is sufficiently low to contribute to a soft landing of the payload; cheap enough for sufficient numbers of them to be deployed in order to establish a network covering a suitably large area, especially given that in some cases the assemblies may be deployed once only (without recuperation of either parachute or payload); and of a design exhibiting low power consumption characteristics in order to provide the payload with a suitably long operating lifetime.

According to an embodiment of the present invention, a parachute (120) is provided for deploying a payload (150) for participating in the establishment of a wireless mesh communications network. A parachute is an umbrella-like device designed to retard the descent of a falling body or payload by creating drag as the parachute and payload pass through a fluid, usually air.

The parachute (120) according to embodiments of the present invention comprises a frame and a covering (124) to form a canopy. The covering (124) may be made of any flexible or rigid layer as long as it provides the parachute (120) with a suitable amount of drag when the parachute (120) is deployed, thereby contributing to slowing the descent of the parachute (120) and its payload (150). Suitable coverings (124) may be made from a textile layer made from any woven material which can be made from various synthetic or natural fibres or non-woven material which can be made from a synthetic or natural sheet. Examples of suitable coverings include silk, nylon or Kevlar sheets. Other coverings are possible and are discussed below.

Figure 5:
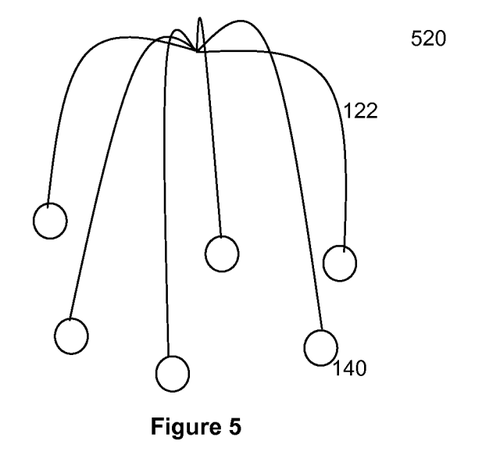
FIG. 5 shows a frame for a parachute according to an aspect of the present invention, the frame being equipped with a plurality of flotation devices.
Figure 6:
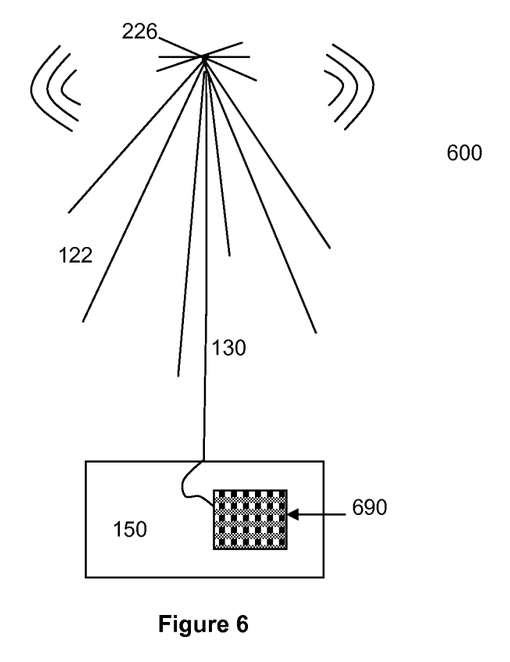
FIG. 6 shows an electronic circuit comprising a wireless communications chip and an antenna connected by a wire as may be deployed within an embodiment of the present invention.

The frame comprises a plurality of spokes (122), each of the spokes (122) being connected together at or near a first end, thereby providing rigidity to the frame. The spokes (122) may be straight as in FIG. 1, substantially straight, or curved as in FIG. 5. They may be connected in a variety of different configurations, as will be discussed below. The spokes (122) provide a structure for the covering (124) and so the shape of the spokes (122) and their configuration must be suitable to provide a form to the covering (124) or canopy and to the parachute (120), which will contribute a sufficient amount of drag to the parachute (120) and its payload (150) during the descent of the parachute assembly (100, 200, 300, 400) following deployment. Suitable forms for the covering (124) include conical, pyramidal, cylindrical, conoidal, generally tapered, circular, hemispherical, square, hexagon or umbrella shape. No particular guidance characteristics are afforded to the glide path of a descending parachute assembly (100, 200, 300, 400) by either the configuration of the spokes or the form of the covering of the parachute (120). The parachute assembly (100, 200, 300, 400) comprises no particular guidance means and therefore no particular advantage related to any particular notion of guidance afforded to the assembly's trajectory during descent may be procured from the form of the covering (124) or the configuration of the spokes (122) comprising the frame of the parachute (120).

The payload (150) is attached to the frame by at least one wire (130). For reasons of improved stability of the assembly during its descent, the payload (150) is arranged to hang from the frame in such a way as to ensure that the assembly maintains a low center of gravity, in keeping with stability requirements for the descending parachute assembly. It can therefore be said that the we have a system as described above, comprising the parachute and the payload, and that the parachute (120) has a first center of gravity, wherein the payload (150) is attached to the frame in such a way that that the resulting system (100, 200, 300, 400, 600) has a second center of gravity which is equal to lower than the first center of gravity.

Another function of the frame is to provide some protection to the assembly during landing or to otherwise facilitate landing. In some operational configurations the parachute assembly may be deployed above an expanse of water in order to provide a soft landing for the payload. For this purpose the frame is configured to provide buoyancy to the parachute assembly should it land on water following deployment. To provide buoyancy, each of the spokes (122) of the frame is further provided with a floatation device (140) at or near a second end, preferably at an extremity of the spoke (122). Suitable flotation devices (140) for this purpose are for example made from polystyrene balls. Flotation devices (140) made from any material and of any dimension are suitable according to embodiments of the present invention as long as they provide sufficient buoyancy to the parachute assembly when it lands on water and as long as they do not adversely affect the glide characteristics or stability of the descending parachute assembly to which they are attached. A parachute frame made from six spokes (122) presents six points where a flotation device (140) may be attached. This may be sufficient to provide the required buoyancy for parachutes and payloads according to embodiments of the present invention. For heavier payloads, different frame configurations may be used and/or higher numbers of flotation devices may be added.

In other operational environments it may be desirable to maximize the chances of achieving good communications coverage by purposely deploying the parachutes above a wooded area such that, by way of the shape of the parachutes (120) or the parachute frames, the probability of each parachute assembly (100, 200, 300, 400) getting stuck at or near the top of a tree is increased. Since the parachutes are used to deploy nodes of the mesh communications network, having the parachutes get stuck in the trees thereby increases the probability of achieving good network coverage.

When the parachute assembly (100, 200, 300, 400) lands on land, the fact that the assembly is light, coupled with the favorable descent characteristics afforded by the configuration of the frame and the drag provided by the covering (124) having appropriate form and dimension, minimizes the chances of damage occurring to the payload (150). The electronics (690) within the payload (150) is preferably protected by a box which can withstand shocks and is waterproof. Said electronics, including the battery, (690) may further be wrapped in epoxy to provide further protection against mechanical shocks. According to another embodiment, still further protection is provided by arranging for a cushion device (480) to hit the ground before the actual payload (150). In this embodiment, it may be arranged for the payload (130) to hang from the frame of the parachute in such a way that it will not touch the ground when before the frame, or will not touch the ground at all when the frame lands. The cushion device (480) is arranged to hang, either from the payload or from the frame or from both the payload and the frame in such a way that the cushion device (480) lies below the payload (150). The cushion device (480) may be either attached by a string or wire to the payload or attached by strings or wires to the spokes, preferably near their second end, as long as that the cushion (480) lies below the payload (150) during descent of the parachute assembly (100, 200, 300, 400). See FIG. 4. In this configuration, the cushion (480) lands before the payload (150) and provides further protection to the payload (150). Depending on the configuration, preferably the cushion lands first and then the flotation devices before the payload experiences the force due to landing, either by landing on the cushion or by pulling on the wire or strings hanging from the frame or a combination of all of these. The frame should preferably be sufficiently rigid to support the shock during landing.

As mentioned above, in order not to render the assembly unstable during its descent, it is arranged that the combination of the payload and the cushion together, when attached to the parachute and floatation devices, maintains a low center of gravity for the parachute assembly. This may be done by choosing an appropriate mass for the cushion compared to the payload, frame and flotation devices.

If the assembly is to be released over water, then it is advantageous that the weight of the cushion and the combined weight of the payload and the frame/covering combination compared with the buoyancy of the flotation devices be such that it contributes to the stability of the assembly once landed on water. This may be done by choosing an impermeable cushion according to its mass or by choosing an absorbent cushion and taking into account the weight it will have once it has absorbed some of the water on which it lands. For a sufficiently strong frame it can be arranged that the payload need not touch the water when the assembly lands on water.

According to a variation of any of the above embodiments, the covering (124) may be made from solar panels installed over the parachute's frame, the solar panels being arranged to charge the battery to provide power to the electronic circuitry within the payload. The battery may also be housed within the payload.

As mentioned previously, the frame of the parachute (120) is made from a plurality of spokes (122) preferably made from a light metal. The spokes may be full (solid) in cross-section or hollow in cross-section (i.e. tubes). By making the spokes from metal the parachute frame serves as an antenna for the communications circuitry (690) within the payload. By having the payload connected to the frame by a metal wire (130), an electrical connection can be established between the antenna and the communications circuitry of the payload when said wire (130) is further routed and connected to said circuitry (690). The primary purpose of the antenna is to allow for reception and/or transmission of signals from one node to other within the mesh network, thus providing a communications path for the transfer of packets from one point to another via the mesh network. The antenna is not used for guidance purposes during deployment of the parachute assemblies.

In order to improve the stability of the assembly, the payload may be attached by strings or wires or rigid stays to the second end of the spokes or to the flotation devices. If any of these attachments were to be made of metal and touch the metal of at least one spoke, then the metal wire mentioned before, connecting the payload to the center of the frame, may be dispensed with.

Figure 1:
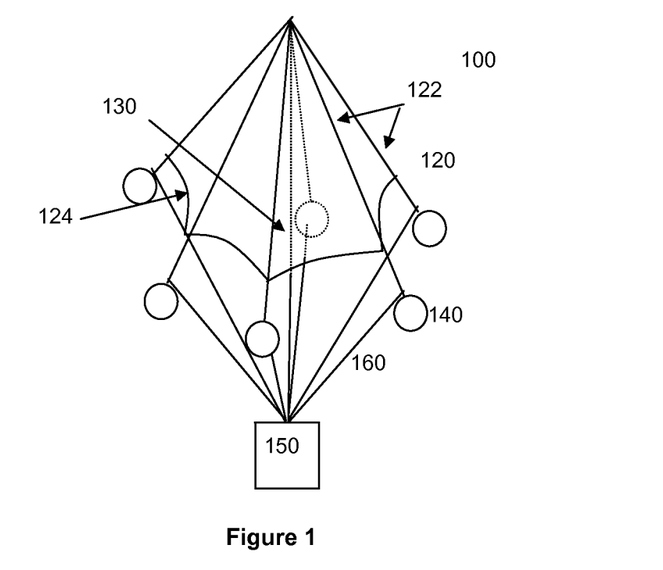
FIG. 1 shows a parachute assembly according to an embodiment of the present invention.
Figure 2:
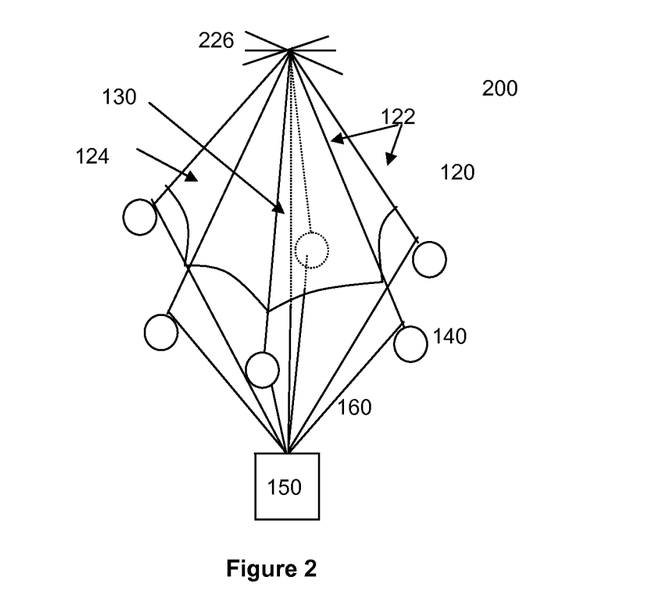
FIG. 2 shows a parachute assembly according to another embodiment of the present invention.

According to another embodiment of the present invention, the antenna provided by the frame may be further modified in order to provide for functionality over a wider bandwidth by adding a horizontal plane on the top (226), thus making it into a discone antenna formed by the spokes and the horizontal plane (see FIG. 2).

When the spokes are connected to each other near their first end, the part left protruding from each spoke may easily be bent between the connection point and the extremity of the first end such that when all of the spokes are assembled together a suitable discone antenna is formed. Alternatively, a separate, generally flat, horizontal part made from metallic material may be attached to the top of the frame where the spokes meet thereby creating the discone antenna. This part of the antenna may otherwise be referred to as an antenna extension.

Figure 3:
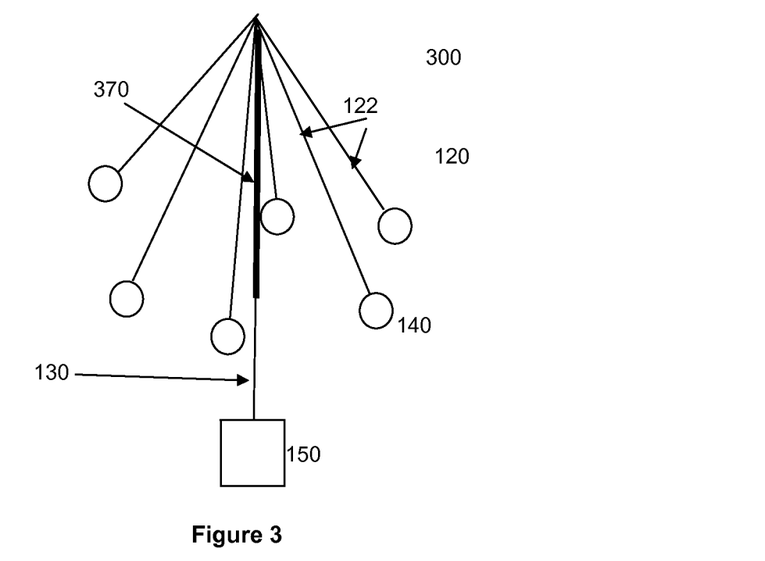
FIG. 3 shows a parachute assembly according to yet another embodiment of the present invention without its covering.
Figure 4:
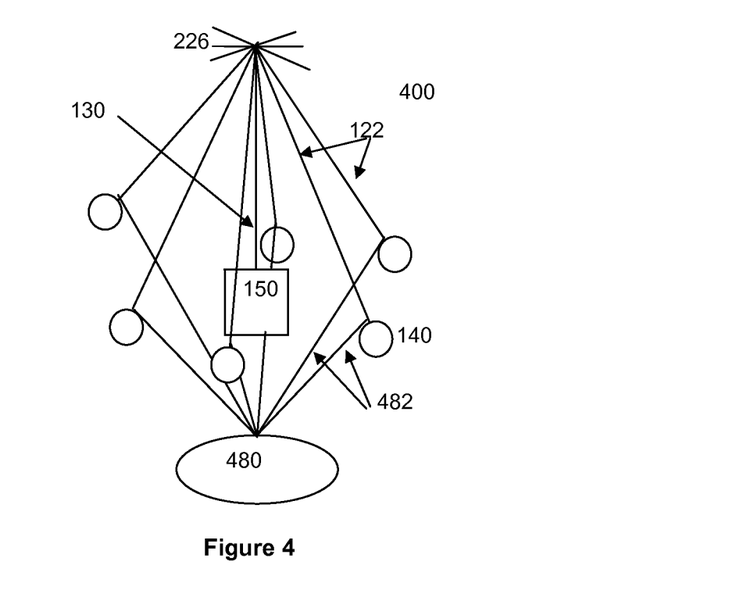
FIG. 4 shows a parachute assembly according to a further embodiment of the present invention.

The discone antenna, formed by at least part of the spokes in a splayed out configuration and by the part providing a horizontal plane at the top of the frame, allows for reception and transmission of signals by the wireless communications circuitry in the payload, such reception and transmission being over a large bandwidth. The discone antenna therefore may be used for nodes which are to function as both receptors and transmitters and may also be used for nodes which are to function as receptors only. Whenever long-range communication with other nodes is required an additional antenna may be added in order to provide a longer range reception capability to the wireless communications circuitry. For such purposes it is preferable that the additional antenna be a long-range vertical antenna (370), as illustrated in FIG. 3. Such a vertical antenna (370) should preferably be installed in such a way that it remains vertical when the parachute assembly reaches its landing place. Long-range communication as referred to above may be realized using the 802.11 standard for example.

A node in which an embodiment of the present invention is deployed may be used as a signal intelligence node (SIGINT) or a communications intelligence node (COMINT). SIGINT is intelligence-gathering by interception of signals. COMINT is a special case of SIGINT wherein the signals to be intercepted are usually between people i.e. communications signals. Either of the mentioned embodiments of antenna are useful for SIGINT and COMINT applications, whether it be the discone antenna including the spokes and the horizontal part at the top of the antenna (122, 226), the vertical antenna (370) or a combination of both (122, 226, 370). Generally, a node functioning as a receiver only is useful as a SIGINT or a COMINT sensor. A node may thus detect a neighbouring node, set up at least one reception path for receiving at least part of a first signal or set up at least one transmission path for transmitting a second signal. The second signal may be related to or otherwise derived from the first signal. The reception path may be from a neighbouring node or from an external link and the transmission path may be towards another neighbouring wireless communications circuit (node) or an external link, either the same external link or another one.

According to embodiments of the present invention it is preferable that the payload be permanently attached to the parachute frame in order to provide wireless communications capability to the circuit within the payload via the parachute frame acting as an antenna after the parachute assembly has been deployed and during the time that is landed as long as the electronic circuitry can be supplied with sufficient power.

With a bill of materials of between ten and twenty dollars, embodiments of the present invention provide for a low-cost parachute assembly for easy and quick deployment of a mesh network either on water or on land (including wooded areas), the network having improved autonomy thanks to the solar panel covering of the parachutes. In order for the parachute assembly to have advantageous glide characteristics the parachute assembly needs to be of lightweight design. In order to maximize the autonomy of the circuitry within the payload of the parachute assembly, such circuitry needs to be of a low-power design.

In order to contribute towards the low-power characteristics mentioned above, a beaconing function may be realized in a node which forms part of a system comprising a plurality of parachute assemblies according to embodiments of the present invention. As part of such a beaconing function, it is arranged for a particular node in the system to operate in a sleep mode (lower power consumption mode wherein only a minimum vital amount of circuitry is kept running) for a large portion of the operating time whenever there are no currently active connections between the particular node and a neighbouring node. Arrangement is made such that the node wakes up at regular intervals to alert neighbouring nodes of its presence and to proceed with forming connections with one or more neighbouring nodes should it be required. The interval may be a few seconds for example or the interval may be dynamic. By dynamic it means that the interval increases each time the node wakes up and finds that there are no connections to be made. A predetermined upper limit to the interval could be could be used. In this manner the node (and neighbouring nodes) allow(s) for fast connections to be made between themselves when the system in which they operate is active, while the node (and neighbouring nodes) consume(s) a correspondingly lower amount of power when the system in which they operate has a lower level of activity. A node adapted to include the beaconing system thus described comprises a timer to measure the interval, over and above the processor, receiver and transmitter of the nodes of the other embodiments.

Advantages of the proposed solution include: low cost; easy, quick deployment without requiring heavy infrastructure; deployment possible over water or over land (including into wooded areas); mesh network is resilient and insensitive to failure of one or more nodes; operable as long as solar energy is available (some embodiments); large frequency range for reception and transmission. The parachute assemblies according to the present invention are devoid of any particular guidance system which would guide the assembly towards any given target and therefore rather have a descent path which is essentially vertical except for any influence engendered by atmospheric conditions such as wind. A parachute assembly according to any of the embodiments of the present invention therefore comprises a parachute which is devoid of particular guidance-conferring features and may not be described as being a parasail or a parafoil. The descent path of the parachute assemblies of the present invention may thus be described as being "free-fall". The descent path may further be described as having a terminal velocity which may be based on a function involving the weight of the payload (or rather the weight of the whole assembly), the shape of the parachute, the dimensions of the parachute, the atmospheric pressure and to some extent the height from which the assembly is dropped. Potential applications of the proposed solution are: connecting remote sites to the Internet; creating local networks in remote sites; performing SIGINT/COMINT and reporting back to base; jamming frequencies.

The invention claimed is:

1. A system comprising:
a plurality of parachutes, each parachute being of a type which, when dropped from a height, exhibits a non-guided free-fall flight path, each parachute comprising a frame made from a metallic material and a covering attached to the frame;
a payload, the payload comprising a wireless communications circuit electrically connected to the frame to use the frame as a first antenna;
wherein the wireless communications circuit of each of the parachutes' payloads is configured at least to:
detect at least one neighboring wireless communications circuit; and
establish a reception and transmission channel with the neighboring wireless communications circuit via at least the first antenna, thereby forming an ad-hoc wireless communications network; and
wherein one of the plurality of parachutes further comprises a first external link thereby providing an exit point from the ad-hoc wireless network; or a second external link thereby providing an entry point to the ad-hoc wireless network.

2. The system according to claim 1, wherein the frame comprises a plurality of spokes each comprising a first end and a second end, the spokes being attached together towards their first end, the second ends of the spokes each being so attached to a flotation device as to engender buoyancy to the system.

3. The system according to claim 2, wherein the first antenna further comprises an antenna extension describing a horizontal plane located towards the first ends of the spokes, the first antenna thereby being configured as a discone antenna.

4. The system according to claim 1, further comprising a second antenna electrically connected to the payload, the wireless communications circuit being further configured such that it additionally communicates via the second antenna, the second antenna being connected to the wireless communications circuit such that the second antenna adopts a vertical attitude with respect to the ground at least when the system is on the ground.

5. The system according to claim 1, further comprising a cushion for providing protection to the payload upon landing, the cushion being attached to the payload in such a way that the cushion lands before the payload.

6. The system according to claim 1, wherein the covering comprises a solar panel for charging a battery for supplying the wireless communications circuit.

7. A wireless mesh communications network comprising a plurality of systems according to claim 1, wherein the wireless communications circuit of each system is configured to detect a presence of at least one neighboring wireless communications circuit and to establish at least one reception path for receiving at least part of a first signal and to establish at least one transmission path for transmitting a second signal towards another neighboring wireless communications circuit.

8. The wireless mesh communications network according to claim 7, wherein at least one of the systems further comprises a first external link for providing an exit point from the network.

9. The wireless mesh communications network according to claim 7, wherein at least one of the systems further comprises a second external link for providing an entry point to the network.

10. A non-guided free-fall retarding device for deploying a wireless communications circuit, the non-guided free-fall retarding device comprising:
a payload including a wireless communication circuit;
a frame; and
a covering attached to the frame;
wherein the non-guided free-fall retarding device is configured as a parachute, and wherein the frame is made from a metallic material and is configured to be connected to the wireless communications circuit, the frame serving as an antenna for the wireless communications circuit;
wherein the non-guided free-fall retarding device is configured to detect neighboring wireless communications systems and to build communication channels between neighboring wireless communications systems, thereby forming an ad-hoc wireless communications network; and
wherein the non-guided free-fall retarding device is further configured to establish a first external link, thereby providing an exit point from the ad-hoc wireless network, or a second external link thereby providing an entry point to the ad-hoc wireless network.

11. The non-guided free-fall retarding device according to claim 10, wherein the frame comprises a plurality of spokes interconnected towards a first end, each of the spokes having a flotation device attached to a second end.

12. The non-guided free-fall retarding device according to claim 10, wherein the covering comprises a solar cell for charging a battery.

13. The device according to claim 10, wherein the antenna comprises a plurality of spokes each having a first end and a second end and an antenna extension describing a horizontal plane located towards the first ends of the spokes, the antenna thereby being configured as a discone antenna.

14. A method for establishing a wireless mesh communications network over an area, the method comprising:
dropping a plurality of parachute systems above an area, each parachute system being of a type which exhibits a non-guided free-fall flight path, each parachute system comprising a frame made from a metallic material and a covering attached to the frame, each parachute system having:

a payload, the payload comprising a wireless communications circuit electrically connected to the frame to use the frame as a first antenna;

configuring the plurality of parachute systems to detect neighboring parachute systems and to build communication channels between neighboring parachute systems, thereby forming a wireless ad-hoc communications network;

wherein one of the parachute systems further comprises a first external link thereby providing an exit point from the network; or a second external link thereby providing an entry point to the network.

15. The method according to claim 14, wherein one of the parachute systems further comprises a first external link thereby providing an exit point from the network; and a second external link thereby providing an entry point to the network.

* * * * *